Sept. 11, 1962 H. J. BUTLER 3,053,346
DISC BRAKES FOR VEHICLES
Filed May 23, 1958 4 Sheets-Sheet 1

INVENTOR
Henry James Butler
by Benj. T. Rauber
his attorney

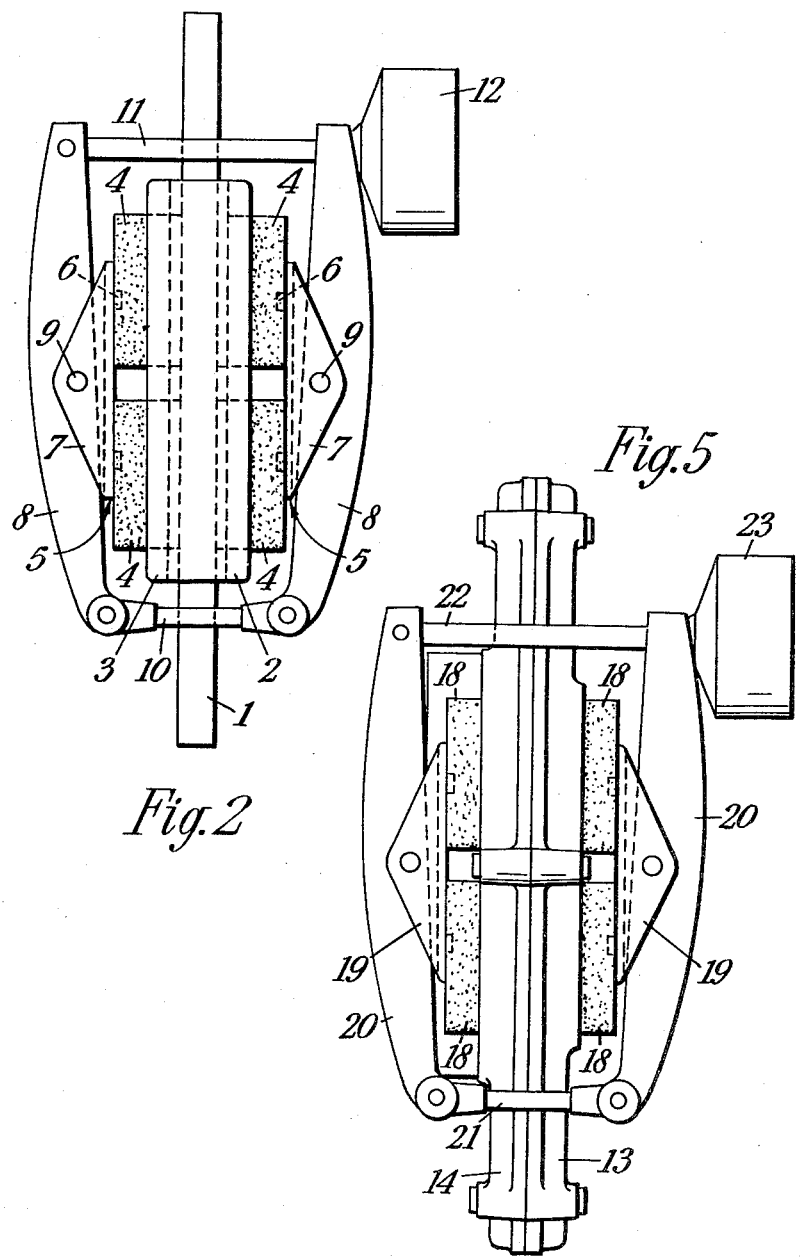

Sept. 11, 1962 H. J. BUTLER 3,053,346
DISC BRAKES FOR VEHICLES
Filed May 23, 1958 4 Sheets-Sheet 3

INVENTOR
Henry James Butler
by Benj. T. Rauber
his attorney

Sept. 11, 1962  H. J. BUTLER  3,053,346
DISC BRAKES FOR VEHICLES
Filed May 23, 1958  4 Sheets-Sheet 4

INVENTOR
Henry James Butler
by Benj. T. Rauber
his attorney

United States Patent Office 3,053,346
Patented Sept. 11, 1962

3,053,346
DISC BRAKES FOR VEHICLES
Henry James Butler, Sutton Coldfield, England, assignor to Dunlop Rubber Company Limited, London County, England, a British company
Filed May 23, 1958, Ser. No. 737,359
13 Claims. (Cl. 188—73)

This invention relates to brakes for vehicles, and more particularly to disc brakes for motor vehicles and the like.

This application is a continuation-in-part of co-pending application Ser. No. 321,919 filed November 21, 1952, now abandoned.

According to the present invention a disc brake assembly comprises an annular disc rotatable by a vehicle wheel, non-rotatable friction pad guide plates located adjacent each radially extending side of the disc and provided with axially-extending guides, pads of friction material slidably located in said guides to frictionally engage said disc, means to force said pads into frictional engagement with the disc and a fluid pressure operated mechanism associated with said means and located remote from said friction pads for effecting said engagement.

Preferably two or more friction pads are provided in side by side location to frictionally engage with each radially extending side of the disc, and the means for forcing them into frictional engagement with the disc comprises one or more pairs of lever arms the levers of each pair being linked together at one end adjacent the outer periphery of the disc and associated at the other end with a fluid pressure operated piston and cylinder mechanism acting through an operating rod also extending adjacent the outer periphery of the disc. Thus when the mechanism is pressurized the lever members are angularly moved toward one another to slidably move the friction pads into contact with the disc. Preferably pivotable pressure plates are located between the friction pads and the lever members to equalize the pressure on the pads exerted by the lever members. The non-rotatable friction pad guide plates in which the friction pads are slidably fitted may comprise a single plate bolted on a non-rotatable part of the wheel assembly and extending radially outwardly adjacent one face of the disc and curved around the outer periphery of the disc to extend radially inwardly adjacent the other face of the disc. Alternatively said plates may be extended to form a complete annulus, as described in my co-pending application Ser. No. 229,967, filed June 7, 1950 (now Patent No. 2,746,577 of May 22, 1956) and thus act as a shroud to prevent fouling of the braking surfaces of the disc by road dust and the like.

In order that the invention may be more fully described, reference is made to the accompanying drawings in which:

FIG. 2 is a view of the same assembly taken in the direction of arrow 2 of FIG. 1;

FIG. 5 is a view of the assembly of FIG. 4 taken in the direction of arrow 5;

Figure 1:
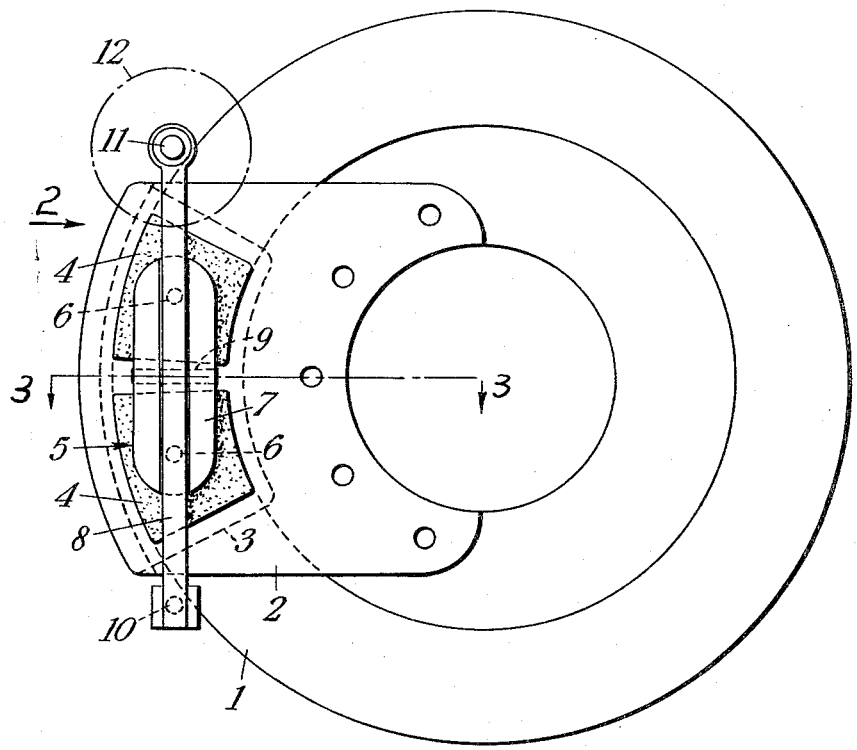
FIG. 1 is a view of a brake disc and disc brake assembly constructed in accordance with one embodiment of the invention.
Figure 3:
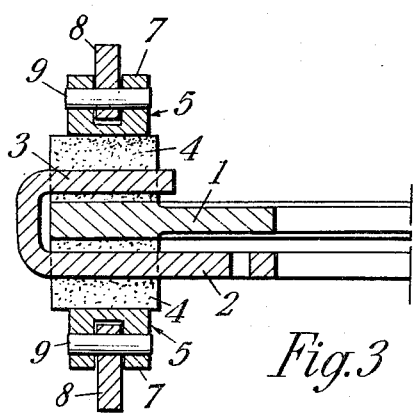
FIG. 3 is a partial sectional view of the same assembly taken through the line 3—3 of FIG. 1 and looking in the direction of the arrows.

The embodiment of the invention illustrated in FIGS. 1, 2 and 3 comprises an annular disc 1 secured at its inner periphery to a rotatable part of a wheel (not illustrated). A substantially square guide plate 2 is secured to a non-rotatable part of the wheel assembly and extends radially outwardly therefrom, adjacent one radially extending face of the disc, to a location beyond the outer periphery of the disc where it is curved round on itself to form a second guide plate 3, substantially segmental in shape, which extends radially inwardly adjacent the other face of the disc. Both plates 2 and 3 are provided with two segmental holes extending therethrough, the holes in each plate being located in side by side relationship and the holes in opposite plates being axially-aligned one with the other. A pad 4 of friction material is slidably fitted in each of said holes, each pad having one face to frictionally engage an adjacent braking face of the disc and the other face standing away from the hole in the associated guide plate.

A pressure plate 5 is located over the projecting faces of the adjacent friction pads on each side of the disc. Each pressure plate is substantially rectangular in shape, the ends thereof being substantially centrally located over each adjacent pad and pegged thereto by pegs 6. The major axis of each pressure plate is normal to a radius of the disc bisecting the guide plate 2. Each pressure plate is provided on its two longer edges with a triangular lug 7, thus defining a rectangular channel between said lugs.

A lever member 8 is located in each of said channels, the centers thereof being secured to the apices of said triangular lugs by pins 9 about which the lever members and pressure plates can rock relative to one another. The ends of the lever members project beyond the outer periphery of the disc. Two adjacent ends of said lever members are each pivotally connected to a link-rod 10 which extends axially adjacent the outer periphery of the disc. The other end of the one lever member has pivotally connected thereto one end of an operating rod 11 which extends axially adjacent the periphery of the disc, through a hole in the adjacent end of the other lever member and is connected to a piston (not illustrated) fluid-tightly slidable in a cylinder 12. The base of the cylinder is pivotally associated with the adjacent end of the lever member and a space between the piston and the base of the cylinder is connected to a source of pressure fluid, e.g. a master-cylinder.

The operation of the brake is as follows: On increasing the pressure between the piston and the base of the cylinder, by means of e.g. a foot-pedal operated master cylinder, the piston and the base of the cylinder are forced mutually apart. This forces the associated ends of the two lever members towards the disc. Said members swing about the ends of the link rod and angular movement of said members forces the two pressure plates towards the disc. The pressure plates are pivotable relative to the lever members, thus the four pads of friction material are forced with an equal pressure into frictional engagement with the radially extending sides of the disc, thus braking the wheel to which the disc is attached.

The brake assembly herein described is light and is economical to produce and easy to maintain. The piston and cylinder are located remote from the disc and hence the rubber seals and the pressure fluid are substantially isolated from any heat generated on braking. Only one piston and cylinder mechanism is required to operate a complete brake and thus only a small volume of pressure fluid is required for its operation.

The disc may be provided with an annular hollow metal shroud which is located close to the radially extending sides and outer peripheral edge of the disc and which is secured at its inner periphery to a nonrotatable part of the wheel assembly. Shrouds of this nature have been developed to protect the braking surfaces of the disc from fouling by road dust and the like, and have been more fully described in my co-pending application Ser. No. 229,967, now Patent No. 2,746,577.

Figure 4:
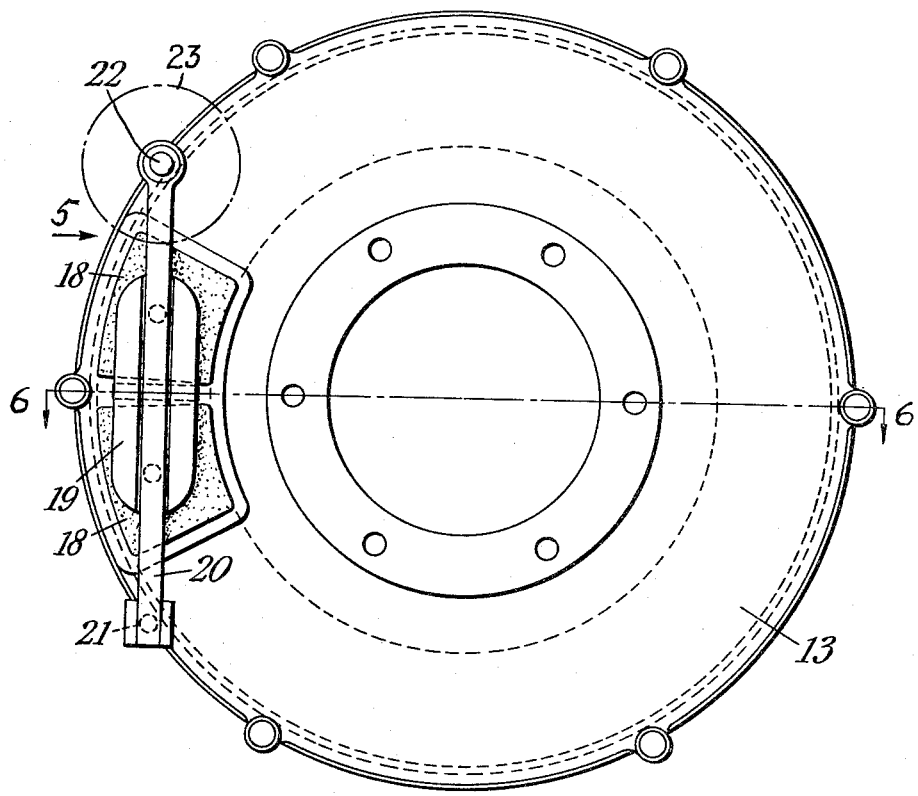
FIG. 4 is a view of a brake disc and disc brake assembly constructed in accordance with another embodiment of the same invention.
Figure 6:
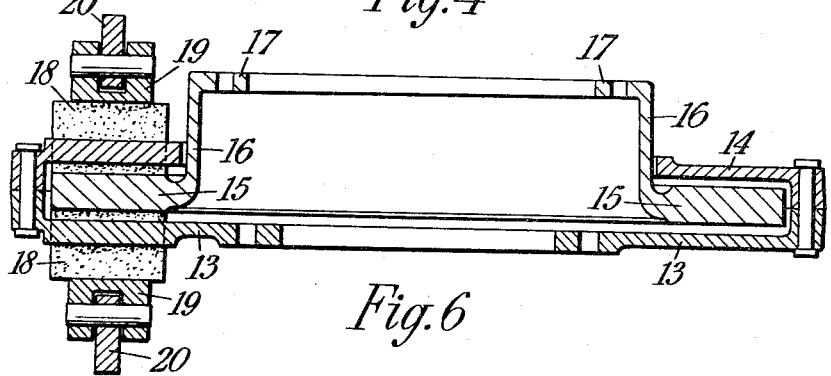
FIG. 6 is a sectional view of the same assembly taken through the line 6—6 and looking in the direction of the arrows.

Such a shroud is employed in another embodiment of the invention, illustrated in FIGS. 4, 5 and 6 in which it is made in two parts 13 and 14, bolted together at their outer peripheral edges. The annular disc 15, rotatable within the shroud, is provided with a cylindrical portion 16 extending axially from the inner periphery thereof, and from the end of said portion an annular flange 17 extends radially inwardly, said flange being adapted to be secured to a rotatable part of the wheel assembly. Each of the two radially extending parts 13 and 14 of the shroud is provided with two segmental shaped holes extending therethrough, said holes in each part being located side by side and axially aligned with the holes in the other part. Pads of friction material 18 are slidably fitted in said holes to frictionally engage the braking faces of the disc. The remainder of the construction is exactly the same as described in the first embodiment of the invention and includes pressure plates 19, lever members 20, link-rod 21, operating rod 22 and piston and cylinder mechanism 23. The operation of the brake is as previously described.

The metal shroud is preferably strengthened so that the brake torque, when the braking pressure is applied, does not unduly stress the metal of the shroud. The lever members may be provided with a piston and cylinder mechanism at each end, and the pressure plates dispensed with, as hereinabove described. One, two or more friction pads may be supplied to co-operate with each side of the disc.

Figure 7:
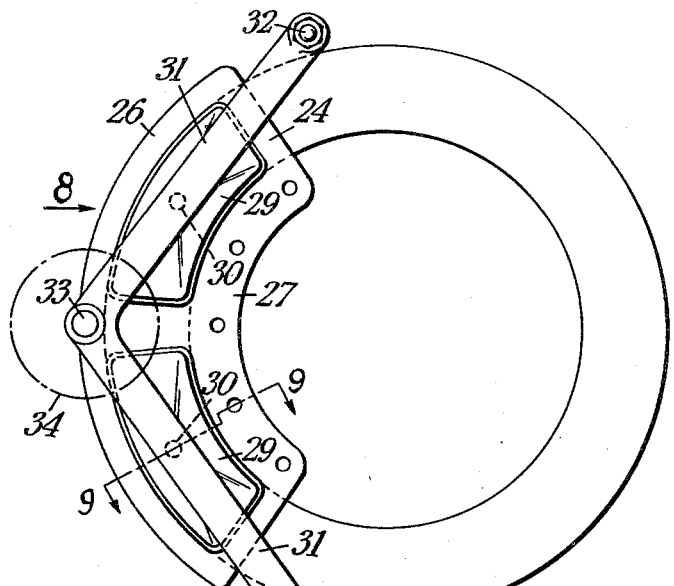
FIG. 7 is a view of a brake disc and disc brake assembly constructed in accordance with yet another embodiment of the same invention.
Figure 9:
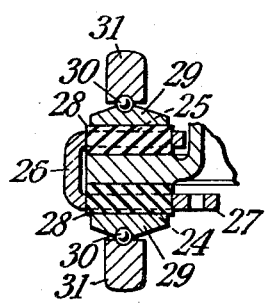
FIG. 8 is a view of the assembly of FIG. 7 taken in the direction of arrow 8 and FIG. 9 is a fragmentary sectional view of the same assembly taken through the line 9—9 of FIG. 7 and looking in the direction of the arrows.
Figure 8:
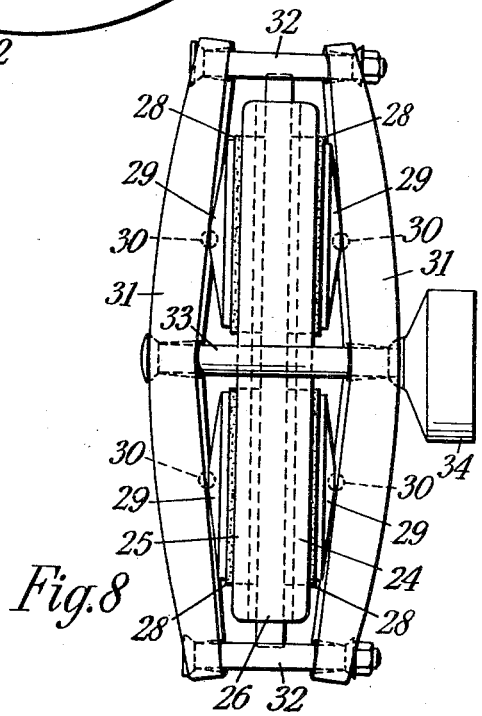

In a further embodiment of the invention, illustrated in FIGS. 7, 8 and 9, both guide plates 24 and 25 are segmental in shape and each covers substantially one third of each of the braking faces of the disc. A portion 26, integral with both plates, extends axially adjacent the periphery of the disc and connects the discs together and the plate 24 is provided, at its inner periphery, with an extension 27 whereby it may be secured to a non-rotatable part of a wheel assembly, as in the first embodiment of the invention.

Each of the two guide plates 24 and 25 is provided with a pair of segmental shaped holes extending axially therethrough, the holes in one plate being axially aligned with the holes in the other plate, and a similarly shaped pad of friction material 28 is slidably fitted in each hole, one face thereof being adapted to contact the adjacent braking face of the disc and the other face standing away from the guide plate.

A segmental pressure plate 29 is located against each pad of friction material, having a planar face secured to said pad and a substantially conical face extending away from the pad. The apex of said conical face is provided with a part-spherical depression in which is seated a ball 30.

A pair of lever members 31 each integrally united at one end to form an angle of the order of 105°, is located on each side of the disc, said lever members being axially aligned one with the other. The ends of said lever members project beyond the outer periphery of the disc and the free ends of said lever members on opposite sides of the disc are pivotally connected by link rods 32 which extend axially adjacent said periphery. An operating rod 33 is pivotally connected to the junction of one pair of lever members on one side of the disc, passes axially adjacent the periphery of the disc and through a hole extending axially through the junction of the other pair of lever members, and is secured to a piston fluid-tightly slidable in a cylinder 34 the base of which is pivotally associated with said junction. The lever members 31 are so positioned that they extend across the pressure plates 29 and are provided, intermediate the ends thereof, with a part-spherical recess to seat the associated ball 30. An annular space is provided between the piston and the base of the cylinder, and this case is connected to a source of fluid pressure e.g. a master cylinder.

This embodiment of the invention operates in a manner similar to that described in connection with the previous embodiments. An increase in fluid pressure between the piston and the base of the cylinder forces said piston and base mutually apart. The junctions of the two pairs of lever members are forced towards one another and the pressure members are thus forced towards the disc, the friction pads associated with said pressure members being forced into frictional engagement towards the disc.

In an alternative construction the ends of the lever members, instead of being pivotally interconnected through the link rods, are pivotally connected to the ends of the guide plates 24 and 25.

Having described my invention, what I claim is:

1. A disc brake assembly comprising an annular disc rotatable in axially fixed position by a vehicle wheel, non-rotatable friction pad guide plates located adjacent each radially extending side of said disc and provided with axially extending guides therethrough, two pads of friction material slidably located in said guides to frictionally engage both sides of said disc, a pair of levers located one on each side of said disc, each lever comprising a pair of legs diverging from an apex outside the periphery of said disc to ends extending beyond the periphery of said discs, said ends being linked together, said apices being linked together by means constituting fluid pressure operated means, each of said levers having a portion thereof to force an associated one of said pairs of friction pads into frictional engagement against said disc, and said fluid pressure operated means comprising a piston and a cylinder adapted to move said levers with equal pressure around a fulcrum constituted by a portion of a pressure plate associated with each said pair of friction pads.

2. A disc brake assembly according to claim 1 wherein each said friction pad has associated therewith a separate pressure plate, each said pressure plate being engageable by a different arm of one or other of said levers.

3. A disc brake assembly according to claim 1 wherein said levers each comprises two straight levers united at one end to form a V, each arm of said levers having a portion to force said associated friction pads against said disc, the free ends of said levers extending outside the periphery of said disc on opposite sides thereof and being pivotally linked adjacent said periphery, said fluid pressure operated mechanism also extending outside the periphery of said disc and linking together said united ends of said lever for effecting said engagement.

4. A disc brake assembly comprising an annular disc rotatable by a vehicle wheel, non-rotatable friction pad guide plates, one adjacent each radially extending side of the disc and having guides to hold a friction pad to move in a direction normal to the radially extending sides of the discs, pads of friction material held by said guides to move to and from said sides, a pair of levers one pair at each side of said disc, each pair of levers being united at one end to form a V, and each lever of said pair having a portion thereof fulcrumed on a respective friction pad to force said pad into frictional engagement against the disc, a pair of links one for each free end of the levers of said pair connecting said levers on one side of said disc to the levers on the other side adjacent the periphery of said disc, and a fluid pressure operated mechanism associated with the united ends of said lever members for forcing the pads of friction material into frictional engagement with the discs.

5. A disc brake which comprises a disc rotatable on its axis and having a pair of annular, radially extending, flat, axially spaced, braking surfaces, a non-rotatable housing having a pair of limbs each spaced closely adjacent to one of said braking surfaces, each limb having a guide passage transverse to the radially extending surfaces of said disc and providing a torque supporting surface terminating at a fixed position adjacent to an opposed braking surface of said disc, a friction element for each limb having a portion movable in the guide passage of its respective limb toward and from said opposed disc braking surface and positioned therein to transmit to the torque supporting surface of said passage the torque stresses imposed on said friction element by the rotation of said disc, and means supported by said friction elements independently of said housing and floating with the movement of said friction elements to move the friction elements in said passage toward the braking surfaces of said disc and comprising a pressure element movable transversely of said disc and housing and having a thrust connection with the friction element on one side of said disc and a reactive connection with the friction element on the other side of said disc to move said friction elements into engagement with the braking surfaces on opposite sides of said disc.

6. The disc brake of claim 5 in which said pressure element comprises a cylinder and piston and said thrust connection comprises a lever on one side of said disc and housing, and said reactive connection comprises a lever on the opposite side of said disc and housing and a link connecting said levers at one end the other ends of said levers being connected one to the cylinder and the other to the piston, each of the levers being connected to one of said friction elements.

7. The disc brake of claim 6 in which said levers extend chordwise of said disc.

8. The disc brake of claim 5 in which said limbs extend radially inwardly from the periphery of said disc and are connected beyond said periphery and cover a portion of the braking surfaces of said disc.

9. The disc brake assembly of claim 5 in which the area of the friction face of said friction elements is different from the area of said piston.

10. The disc brake assembly of claim 8 in which said friction elements are of segmental shape.

11. The disc brake of claim 5 in which the means to move the friction elements in said passage toward the braking surfaces of said disc comprises a pair of levers, one for each limb extending chordwise of said disc and beyond the periphery of said disc and pivoted on the friction member on its side of the disc, a link beyond the periphery of said disc connecting the levers at one end and means beyond the periphery of said disc for forcing each friction member into engagement with the adjacent braking surface of said disc.

12. The disc brake of claim 5 in which said friction element consists of a block of friction material.

13. A disc brake assembly comprising a non-rotatable mounting structure, a disc engaging with a rotatable member to be braked and braking means extending circumferentially over only a minor portion of the braking surfaces of the disc and comprising a non-rotatable housing having limbs extending closely adjacent each of the opposite surfaces of the disc and in fixed axial relation thereto, means for mounting said housing through the radially inner portion of only one of said limbs which is fastened to said non-rotatable structure to resist brake torque, friction members, one on each side of said disc, each said friction member proportioned to be of smaller length than its associated limb and movable therein to bring its friction surface into frictional engagement with its side of said disc, each limb providing an anchoring element extending closely adjacent the disc in position to receive adjacent said disc the anchoring thrust of its friction member at one or the other of the ends thereof, said anchoring element having a clearance from the adjacent braking surface of the disc which provides substantially constant guidance throughout the wear-life of the friction member, actuator means spaced remotely from the friction pads for forcing each friction member into frictional engagement with the adjacent braking surfaces of the disc and means intermediate said actuator means and said friction member to provide swiveling movement of the friction member enabling the friction surface thereof to conform with the opposed disc surface.

References Cited in the file of this patent
UNITED STATES PATENTS

| | | |
|---|---|---|
| 340,580 | Huber | Apr. 27, 1886 |
| 1,978,974 | Williams | Oct. 30, 1934 |
| 2,115,083 | Pierce | Apr. 26, 1938 |
| 2,180,092 | Oelkers | Nov. 14, 1939 |
| 2,214,762 | Eksergian | Sept. 17, 1940 |
| 2,399,010 | Eksergian et al. | Apr. 23, 1946 |
| 2,563,392 | Butler | Aug. 7, 1951 |
| 2,663,384 | Chamberlain | Dec. 22, 1953 |
| 2,672,956 | Webb et al. | Mar. 23, 1954 |
| 2,701,626 | Walther | Feb. 8, 1955 |
| 2,790,516 | Wright et al. | Apr. 30, 1957 |

FOREIGN PATENTS

| | | |
|---|---|---|
| 440,592 | Germany | Feb. 10, 1927 |
| 635,603 | Great Britain | Apr. 12, 1950 |